United States Patent [19]

Copen et al.

[11] Patent Number: 4,995,036
[45] Date of Patent: Feb. 19, 1991

[54] MULTICHANNEL DATA COMPRESSOR

[75] Inventors: William A. Copen, Bloomfield; Ashok M. Patel, Taylor; Daniel R. Bush, Middleville, all of Mich.

[73] Assignee: General Dynamics Land Systems, Inc., Troy, Mich.

[21] Appl. No.: 390,885

[22] Filed: Aug. 7, 1989

[51] Int. Cl.$^5$ ............................................. H04J 15/00
[52] U.S. Cl. ..................................... 370/118; 358/135
[58] Field of Search ................ 370/109, 118; 375/122; 358/135, 136, 141, 142, 146

[56] References Cited

U.S. PATENT DOCUMENTS

| | | | |
|---|---|---|---|
| 3,936,595 | 2/1976 | Yanagimachi et al. | 178/5.6 |
| 3,991,265 | 11/1976 | Fukuda et al. | 178/5.6 |
| 4,099,202 | 7/1978 | Cavanaugh | 358/85 |
| 4,237,484 | 12/1980 | Brown et al. | 358/142 |
| 4,542,406 | 9/1985 | Shimoyama et al. | 358/141 |
| 4,544,950 | 10/1985 | Tu | 358/143 |
| 4,593,318 | 6/1986 | Eng et al. | 358/142 |

Primary Examiner—Douglas W. Olms
Assistant Examiner—Melvin Marcelo
Attorney, Agent, or Firm—Brooks & Kushman

[57] ABSTRACT

A multichannel data compressor (20) for a data transmission system having a plurality of data sources. The multichannel data compressor has a plurality of data latches (44,46,48) for temporarily storing the data generated by each data source and a plurality of difference circuits (52,54,56), one for each data source, which subtract the data stored in the data latches from the next subsequent data value generated by the data sources to generate a difference data value. A plurality of summing circuits (58,60,62) sum the difference data values to generate a plurality of composite data values. A selector switch (64) transfers the composite data values or selected current data values to a multiplexer (72) when the magnitude of at least one of the composite data values exceeds a predetermined value. The multiplexer (72) formats the received data into a predetermined format, converts it to a serial format, then forwards the data to a transmitter for transmission. A receiver system (4) has a multichannel data expander (26) that regenerates, in response to a received data transmission, data as originally generated by the data sources.

41 Claims, 3 Drawing Sheets

BINARY CODE
TO MULTIPLEXER
72

MULTICHANNEL DATA COMPRESSOR

BACKGROUND OF THE INVENTION

1. Field Of The Invention

The invention is related to data compression communication systems and, in particular, a data compressor which generates a composite data value from the data received from a plurality of data sources.

2. Prior Art

Data compression has been known in the art to reduce the bandwidth of the transmission system or to increase the sampling rate of the data to be sent. As data requirements become higher and higher, data compression remains one way in which more data can be transmitted without having to increase the bandwidth of the transmission system. Eng et al. in U.S. Pat. No. 4,593,318 discloses a technique for time compressing television signals in which the transmission comprises a line, frame, or field, as received plus two other lines, frames or fields as differential signals Eng et al. also teaches multiplexing the output of three different video sources so that the output of the three different video sources can be transmitted in the same time span normally required to transmit the same data, as originally generated from a single video data source.

Cavanaugh, in U.S. Pat. No. 4,099,202, Brown et al. in U.S. Pat. No. 4,237,484, Shimoyama et al. in U.S. Pat. No. 4,542,406 and Tu in U.S. Pat. No. 4,544,950 teach the multiplexing of the digital audio and video data for simultaneous transmission, rather than transmitting them on separate sidebands as done with commercial television transmissions.

Various data compression techniques and multiplexing data from a plurality of data sources are known in the art. The present invention is a multichannel data compression system wherein the data from a plurality of data sources is compressed and multiplexed to generate a compressed data word which significantly increases the sampling rate of the plurality of data sources over the sampling rate if the data from each data source was transmitted in its entirety.

SUMMARY OF THE INVENTION

A multichannel data compressor for a transmission system has a plurality of data sources and a transmitter for transmitting compressed data to a remote location. The multichannel data compressor has a plurality of difference amplifiers, one for each data source, which subtract the previous data value generated by its associated data source from the current data value to generate a plurality of difference data values. A like plurality of summing means sum said plurality of difference data in different sequences to generate a plurality of composite data values. A multiplexer multiplexes the plurality of composite data values in a predetermined format to generate a compressed data word for transmission by the transmitter.

The preferred embodiment includes a remotely located receiver system having a receiver and a multichannel data expander. The multichannel data expander has a demultiplexer for demultiplexing the transmitted compressed data word to reconstruct each of the plurality of composite data values. Composite data sum amplifiers sum selected composite data values, to generate correction data values which correspond to the difference data values generated by the multichannel data compressor. A plurality of adders, one associated with each data value, add each correction data value to its associated data value to update each of the data values stored in a current data latch to generate a current data value.

A selector switch is provided in the multichannel data compressor for transferring selected data values received from the data sources when one or more of the composite data values exceeds a predetermined value.

The object of the multichannel data compressor is to compress the data from a plurality of data sources permitting the bandwidth of the transmitter to be reduced.

Another object of the multichannel data compressor is to generate a plurality of data values which are a composite of the data generated by the plurality of data sources.

Another object of the multichannel data compressor is to increase the sampling rate of the transmission system without increasing its bandwidth.

These and other objects and features of the data compressor will become apparent to one skilled in the art from reading the detailed description of the invention in conjunction with the drawings. cl BRIEF DESCRIPTION OF THE DRAWINGS FIG. 1 is a block diagram of a data communication system embodying a multichannel data compressor and a multichannel data expander;

FIGS. 5-7 show the 18 bit format of the different transmitted data value words transmitted by the transmitter.

DETAILED DESCRIPTION OF A PREFERRED EMBODIMENT

Figure 1:
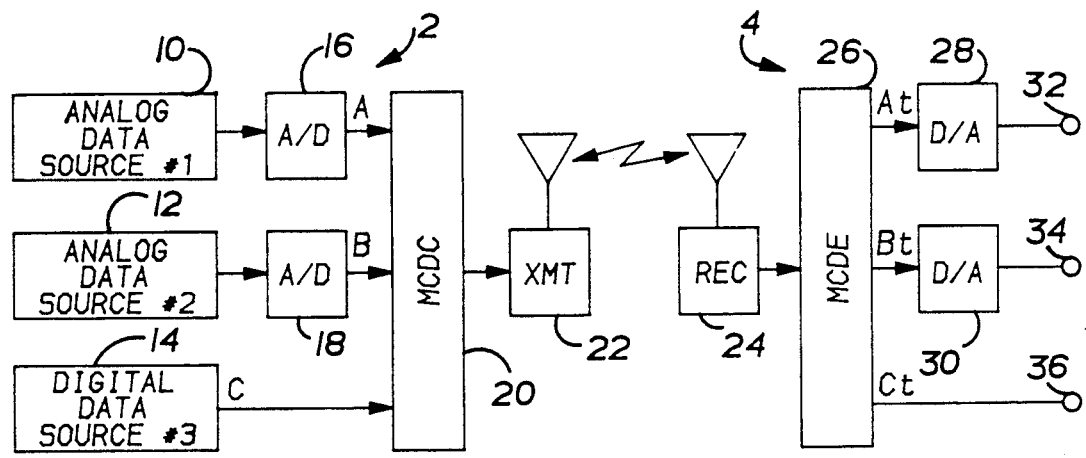

A typical communication system in which the multichannel data compressor may be used is illustrated in FIG. 1. In this system, the information generated by three different sources are to be transmitted to a remote location by radio or any other type of communication link. Although the preferred embodiment is illustrated and described with reference to a system having three information sources, it is to be understood that concept of the multichannel data compressor will not be limited to this number.

Referring to FIG. 1, the illustrated system, has a transmitter subsystem 2 and a receiver subsystem 4. The transmitter subsystem has a first analog data source 10, a second analog data source 12 and a digital data source 14. The analog data sources 10 and 12 may be of any type known in the art, such as an audio signal generator, the analog data output of a television camera, or the output of an analog sensor. In a like manner, the digital data source 14 may be of any known type, such as the output of a computer, or a digital sensor. As would be recognized by a person skilled in the art, all the data sources may be analog data sources or may all be digital data sources, or the data sources 10, 12 and 14 may be any combination of analog and digital data sources.

Prior to being transmitted to the multichannel data compressor (MCDC) 20, the analog data generated by the analog data sources 10 and 12 are converted to a digital format by Analog-to-Digital (A/D) converters 16 and 18, respectively. The multichannel data compressor 20 will compress the data into a unique format which is transmitted to the receiver subsystem 4 at a remote location by a transmitter 22. The transmitter 22 may be a radio transmitter as shown, may be a wire transmitter such as a telephone communication link or a fiber optic communication link.

A receiver 24 at the remote location will receive the information transmitted by the transmitter 22 and forward it to a Multichannel Data Expander (MCDE) 26. The Multichannel Data Expander 26 will reconstruct the data to a digital format identical to that received by the multichannel data compressor 20. If required, Digital-to-Analog (D/A) converters 28 and 30 will convert the digital data corresponding to the analog data received from Analog Data Sources 10 and 12 back to their original analog format. The analog data from Digital-to-Analog converters 28 and 30 are available at output terminals 32 and 34, respectively, while the digital data corresponding to the data received by the multichannel data compressor 20 from the Digital Data Source 14 is available at output terminal 36 which is connected directly to the data output of the Multichannel Data Expander 26.

The details of the multichannel data compressor 20 will now be discussed relative to FIG. 2. The digital data "A" corresponding to the output of the first Analog Data Source 10 after being converted to a digital format by Analog-to-Digital converter 16 is received at an input terminal 38. In a like manner, the digital data B corresponding to the output of the second Analog Data Source 12 after being converted to a digital format by Analog-to-Digital converter 18 is received at input terminal 40 while digital data C from Digital Data Source 14 is received directly at input terminal 42.

The absolute value of data A received at input terminal 38 is communicated directly to a data latch 44, a positive input of a difference circuit 52 and a selector switch 50. The latch 44 stores the absolute value of data A for one data cycle. The value of data A stored in the data latch 44, hereinafter identified as data $A_t$, is transmitted to the negative input of difference circuit 52 in response to a transmit clock signal generated by a transmit clock 70 in synchronization with the receipt of the next subsequent absolute value $A_{t+1}$ of data A. A 10 megahertz clock 68 clocks the data in and out of data latches 44, 46, and 48 and in and out of a composite data latch 64 in a conventional manner.

The difference circuit 52 subtracts the value of $A_t$ from the value of $A_{t+1}$ to produce difference data value $\Delta A$ which is the difference between the current value $(A_{t+1})$ and the preceding value $(A_t)$ of data A. The output of difference circuit 52 is connected to a positive input of sum circuits 58 and 60 and a negative input of sum circuit 62.

In a like manner, terminal 40 which receives the absolute value of data B is connected to the input of a data latch 46, the positive input of a difference circuit 54 and to the selector switch 50. The data latch 46 stores the absolute value of data B for one data cycle and transmits the data B, referred to as data $B_t$ to the difference circuit 54 in synchronization with the next iteration, data $B_{t+1}$ of data B. The difference circuit 54 subtracts $B_t$ from $B_{t+1}$ to generate difference data value $\Delta B$ which is the difference between the current value $(B_{t+1})$ and the preceding value $B_t$ of data B. The difference data value $\Delta B$ is applied to the positive inputs of sum circuits 58 and 62 and to the negative input of sum circuit 60.

Input terminal 42 is connected to the input of data latch 48, the positive input of difference circuit 56 and to selector switch 50. The data latch 48 stores the absolute value of data C as $C_t$ which is transmitted to the negative input of difference circuit 56 in synchronization with the next iteration, data $C_{t+1}$ of data C. The difference circuit 56 subtracts $C_t$ from $C_{t+1}$ to generate difference data value $\Delta C$ which is the difference between the current value $(C_{t+1})$ and the preceding value $(C_t)$ of the data C. The difference data $\Delta C$ is transmitted to the positive inputs of sum circuit 60 and 62 and the negative input of sum circuit 58.

The sum circuit 58 generates composite data value D which is the sum of difference data values A, $\Delta B$, and $\Delta C$ where:

$$D = \Delta A + \Delta B - \Delta C$$

In a like manner, the output of sum circuit 60 is composite data E where:

$$E = \Delta A - \Delta B + \Delta C$$

and the output of sum circuit 62 is composite data F where:

$$F = \Delta B + \Delta C - \Delta A$$

The outputs of the sum circuits 58, 60, and 62 are connected to a composite data latch 64 which independently stores the composite data values D, E, and F. The outputs of the sum circuits 58, 60, and 62 are also connected to the selector switch 50 and are used to determine whether the composite data values D, E, and F or the absolute values $A_{t+1}$, $B_{t+1}$ and $C_{t+1}$ are to be transmitted by the transmitter 22 as shall be explained with reference to FIG. 3.

The composite data latch 64 has three outputs, one for each of the three composite data values D, E, and F, which are directly connected to the selector switch 50. As previously discussed, the absolute values data $A_{t+1}$, $B_{t+1}$, and $C_{t+1}$, received at input terminals 38, 40 and 42 are also transmitted to selector switch 50. The selector switch 50 will select for transmission, either the absolute values of the received data $A_{t+1}$, $B_{t+1}$, and $C_{t+1}$, or the composite data values D, E, and F dependent upon the magnitude of the composite data D, E or F. If the magnitude of any one of the composite data D, E or F exceed a predetermined value, the absolute value of the data $A_{t+1}$, $B_{t+1}$, or $C_{t+1}$ will be transmitted, otherwise the composite data D, E and F will be transmitted.

The output of the selector switch 50 is connected to a multiplexer 72 which assembles the data received from the selector switch 50 into a predetermined format. The multiplexer 72 will then serially transfer this data to the transmitter 22 through output terminal 74.

Figure 3:
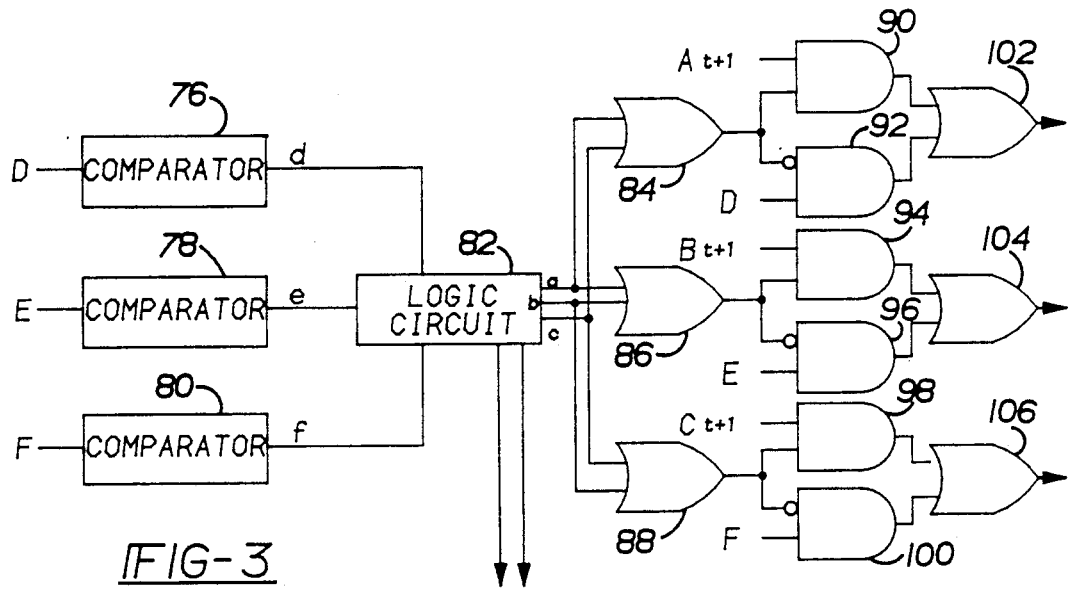
FIG. 3 is a circuit diagram used to explain the function of the selector switch 50.

The logical function of the selector switch 50 is shown in FIG. 3. The composite data values D, E and F are received, respectively, by a set of comparators 76, 78 and 80. Each of these comparators compares the magnitude of the composite data value, for example, the number of bits, with a predetermined value, and generates an output when the composite data value exceeds the predetermined value. The outputs of comparators 76, 78 and 80 are received by a logic circuit 82. The logic circuit has a first output "a" which connected to inputs to OR gates 84 and 86, a second output "b" connected to OR gates 86 and 88 and a third "c" output which is connected to OR gates 84 and 88. The logic circuit 82 also generates a two bit digital code which is transmitted to the multiplexer 72 identifying the data to be transmitted.

Table I shows the truth table for the logic circuit 82 as a function of the outputs of comparators 76, 78 and 80 in response to the composite data values D, E and F received from the sum circuits 58, 60, and 62.

TABLE I

Truth Table For Logic Circuit 82

| Comparator Outputs | | | Digital Code | Logic Circuit Output | Data To Be Transmitted |
|---|---|---|---|---|---|
| d | e | f | | | |
| 0 | 0 | 0 | 00 | None | D, E, F |
| 1 | 0 | 0 | 01 | a | $A_{t+1} B_{t+1}$ |
| 0 | 1 | 0 | 01 | a | $A_{t+1} B_{t+1}$ |
| 0 | 0 | 1 | 10 | c | $A_{t+1} C_{t+1}$ |
| 1 | 0 | 1 | 10 | c | $A_{t+1} C_{t+1}$ |
| 1 | 1 | 0 | 01 | a | $A_{t+1} B_{t+1}$ |
| 0 | 1 | 1 | 11 | b | $B_{t+1} C_{t+1}$ |
| 1 | 1 | 1 | 01/10 | a/c | $A_{t+1} B_{t+1}$/ $A_{t+1} C_{t+1}$ |

This truth table is based on the assumption that the priority of data C is less than the priority of data B and that the priority of data B is less than the priority of data A. When the outputs d, e and f of all three comparators are logic 1's than the logic circuit 82 will sequentially generate digital codes 01 and 10 such that the absolute values of $A_{t+1}$ and $B_{t+1}$ and $A_{t+1}$ and $C_{t+1}$ will be transmitted in the next two transmissions.

Referring back to FIG. 3, the OR gate 84 is connected to one input of AND gate 90 and to the inverting input of NAND gate 92. The absolute value of data $A_{t+1}$ is received at the other input of AND gate 90 and the composite data value D is received at the noninverting input of NAND gate 92. The outputs of AND gate 90 and NAND gate 92 are connected to the inputs of OR gate 102 whose output is connected to multiplexer 72. In a like manner, the output of OR gate 86 is connected to one input of AND gate 94 and to the inverting input of NAND gate 96. The absolute value of $B_{t+1}$ is received at the other input of AND gate 94 and the composite data value E is received at the noninverting input of NAND gate 96. The outputs of AND gate 94 and NAND gate 96 are connected to OR gate 104 whose output is connected to multiplexer 72. The output of OR gate 88 is received at one input of AND gate 98 and the inverting input to NAND gate 100. The absolute value of $C_{t+1}$ is received at the other input of AND gate 98 and the composite data value F is received at the noninverting input of NAND gate 100. The outputs of AND gate 98 and NAND gate 100 are connected to OR gate 106 whose output is connected to the multiplexer 72.

The operation of the selector switch 50 is as follows:

If the outputs d, e and f of comparators 76, 78 and 80 are all logical 0's, than the outputs a, b, and c of logic circuit 82 are all logical 0's disabling AND gates 90, 94 and 98 and enabling NAND gates 92, 96 and 100. In this state, the selector switch will transmit the composite data values D, E, and F, currently stored in latch 64 to the multiplexer 72. The logic circuit 82 will also generate a digital code 00 which is also transmitted to the multiplexer 72 along with the composite data. The multiplexer 72 will multiplex the composite data values D, E and F and the binary code to form an 18 bit compressed data word which is transferred to the transmitter 22 in response to the signals received from the 18 stage counter 66.

If the outputs d, e, or both d and e of comparators 76 and 78 are logical 1's, than the output "a" of logic circuit 82 will become a logical 1 enabling AND gates 90 and 94 to pass the absolute data values $A_{t+1}$ and $B_{t+1}$ to the multiplexer 72 through OR gates 102 and 104, respectively, and disabling NAND gates 92 and 96. The logic circuit 82 will also forward the binary code 01 to the multiplexer 72 identifying that the absolute data $A_{t+1}$ and $B_{t+1}$ are to be transmitted.

If the outputs e and f of comparators 78 and 80 are logical 1's, the output "b" of logic circuit 82 will become a logical 1 enabling AND gates 94 and 98 to pass the absolute data $B_{t+1}$ and $C_{t+1}$ to the multiplexer 72 an disabling NAND gates 96 and 100. The logic circuit will also generate the code 11 identifying that the absolute data $B_{t+1}$ and $C_{t+1}$ are to be transmitted.

If the output "f" or outputs d and f of comparators 76 and 80 are logical 1's, the output c of logic circuit 82 will become a logical 1 enabling AND gates 90 and 98 to pass the absolute data $A_{t+1}$ and $C_{t+1}$ to the multiplexer 72 and disable NAND gates 92 and 100. The logic circuit 82 will then generate the code 10 identifying that the absolute values of data $A_{t+1}$ and $C_{t+1}$ are to be transmitted.

If the outputs "d", "e", and "f" of comparators 76, 78, and 80 are all logical 1's, the output "a" of logic circuit 82 will first become a logical 1 enabling AND gates 90 and 94 to pass the absolute data $A_{t+1}$ and $B_{t+1}$ to the multiplexer 72 and the logic circuit 82 will simultaneously transmit the code 01 to the multiplexer signifying that the absolute data $A_{t+1}$ and $B_{t+1}$ are to be transmitted. After the transmission of $A_{t+1}$ and $B_{t+1}$, the output "c" of the logic circuit 82 will become a logical 1 enabling AND gates 90 and 98 to pass the absolute data $A_{t+1}$ and $C_{t+1}$ to the multiplexer 72 and the logic circuit will simultaneously transmit the code 10 to the multiplexer 72 signifying that the absolute data $A_{t+1}$ and $C_{t+1}$ are to be transmitted.

Figure 4:
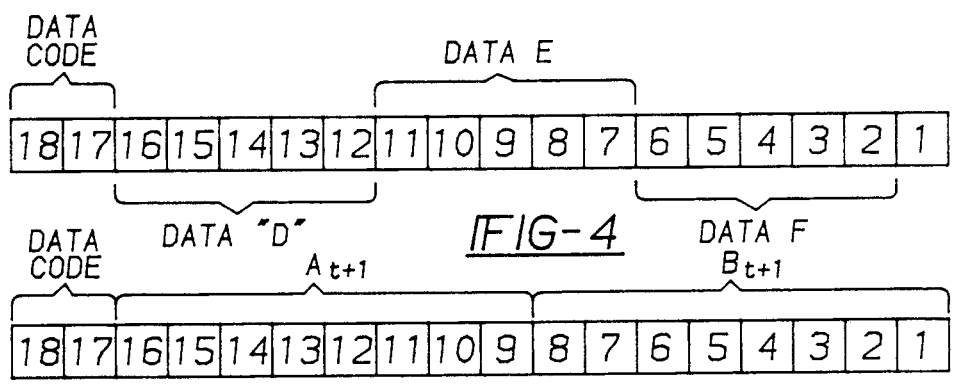
FIG. 4 shows the 18 bit format of the compressed data word transmitted by the transmitter.

The operation of the multichannel data compressor 20 will now be discussed with reference to a specific example to illustrate the degree of data compressibility obtainable. In this example, the digital data values A, B, and C received from their respective sources is in the form of an 8 bit byte and the compressed data transmission by transmitter 22 is in the form of an 18 bit word as shown in FIG. 4 in which the least significant bit is bit 1. The most significant bits, bits 18 and 17 are a binary code, such as 00, identifying the message as a compressed data message containing composite data values D, E and F. Bits 16-12 contain composite data values "D", bits 11-7 contain composite data value "E" and bits 6-2 contain composite data value "F". In the event one or more of the compressed data value exceeds 5 bits, the logic circuit 82 will initiate the transmission of the absolute values of data $A_{t+1}$, $B_{t+1}$ and $C_{t+1}$ as previously described. FIG. 5 shows the data format for the transmission of the absolute values of data $A_{t+1}$ and $B_{t+1}$. Again, the most significant bits 18 and 17 are a binary code, such as 01, identifying that the data contained in the transmitted word contains the absolute values of data $A_{t+1}$ and $B_{t+1}$. The 8 bit value of absolute data $a_{t+1}$ is contained in bits 16-9 of the transmitted word and the 8 bit value of absolute data $B_{t+1}$ is contained in bits 8-1.

Figure 6:
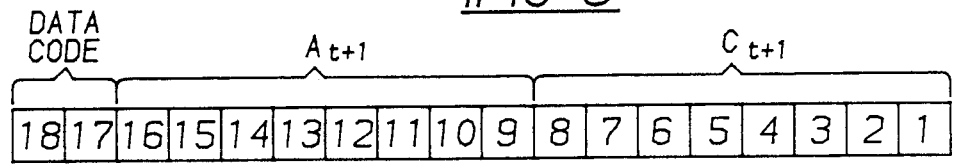
Figure 7:
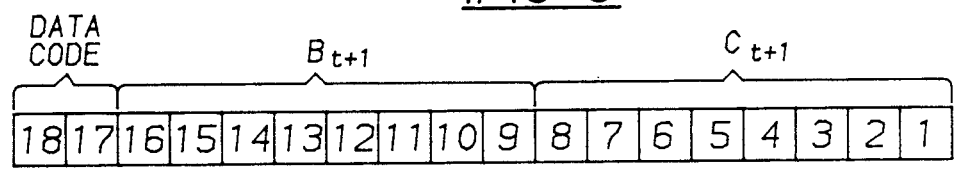

In a like manner, the transmission formats for the 8 bit values of absolute data $A_{t+1}$ and $C_{t+1}$ and of absolute data $B_{t+1}$ and $C_{t+1}$ are shown in FIGS. 6 and 7, respectively. As discussed relative to the transmission formats shown in FIGS. 4, 5, 6, and 7, bits 18 and 17 are a binary code identifying the type of data contained in the transmitted word. As is known in the art, the transmitter 22 may add parity bits to the beginning end of the transmitted word to check the accuracy of the transmission.

Figure 2:
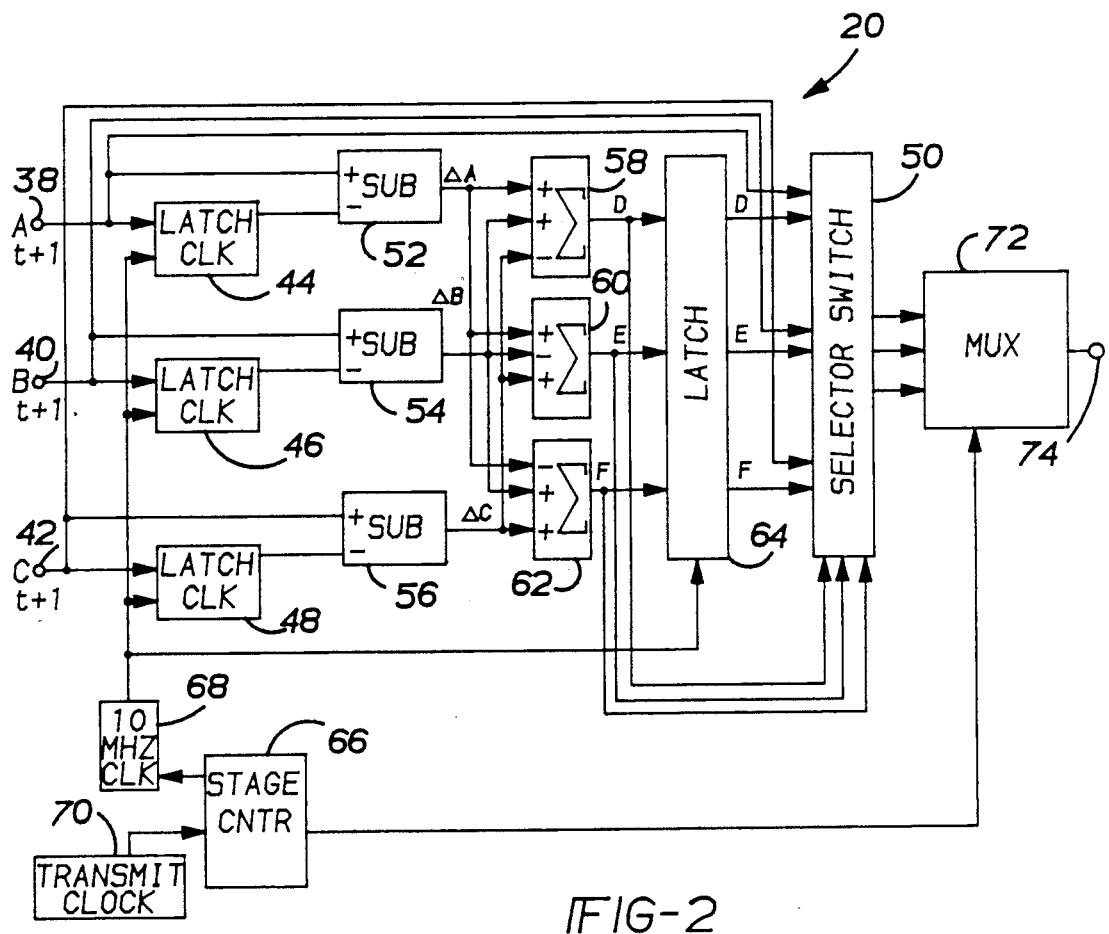
FIG. 2 is a circuit diagram of the multichannel data compressor.

Referring to FIG. 2, as the initial 8 bit absolute values of the data A, B, and C are received, they are temporarily stored in data latches 44, 46, and 48, respectively. Since the initial content of data latches 44, 46, and 48 are zero (0), the outputs $\Delta A$, $\Delta B$ and $\Delta C$ of difference circuits 52, 54, and 56 are respectively equal to the absolute values of data A, data B and data C. As a result, the outputs of the sum circuits 58, 60, and 62 will normally be greater than 5 bits, therefore the selector switch 50 will select the absolute values of data A, B and C for the initial transmissions by the transmitter 22. The transmitter 22 will transmit two sequential messages as previously described, each containing different combinations of the absolute values of the data A, B and C such that all three absolute values of the data A, B and C are transmitted.

In a like manner, the next iteration data $A_{t+1}$, $B_{t+1}$ and $C_{t+1}$ are stored in data latches 44, 46, and 48, respectively. Simultaneously, the data $A_t$, $B_t$ and $C_t$ previously stored in data latches 44, 46 and 48 are subtracted from the values of data $A_{t+1}$, $B_{t+1}$ and $C_{t+1}$ in difference circuits 44, 46, and 48 to produce difference data values $\Delta A$, $\Delta B$, and $\Delta C$. The difference data values $\Delta A$, $\Delta B$ and $\Delta C$ are then summed in sum circuit 58, 60 and 62 to generate the composite data values D, E and F which are temporarily stored in composite data latch 64. If each of the composite data values D, E and F is 5 bits or less, the selector switch 50 will pass the composite data values D, E and F from the composite data latch 64 to the multiplexer 72 for the next transmission. The multiplexer 72 will format the composite data in the compressed data format shown in FIG. 4, add the data code bits in bit positions 18 and 17 and serially transmit the formatted compressed data word to the transmitter 22 for transmission.

In the event one or more of the compressed data D, E or F is larger than 5 bits, the selector switch 50 will transfer the appropriate absolute values of $A_{t+1}$, $B_{t+1}$ or $C_{t+1}$ to the multiplexer 72 where it is formatted as required (FIGS. 5, 6 or 7) and forwarded to the transmitter 22 for transmission.

The effectiveness of the multichannel data compressor 20 is obviously a function of how frequently absolute values of the data need to be transmitted. Table II shows the data compression ratio as a function of the frequency (% of time) of transmissions in which absolute values of data are sent.

TABLE II

| Multichannel Data Compressor Compression Ratio | | | |
|---|---|---|---|
| Absolute Value Transmissions (% of time) | Average Bits Per Data Packet | Compression Ratio | Sampling Rate |
| 0 | 18.0 | 1.67 | 55.56 KHZ |
| 10 | 19.8 | 1.52 | 50.51 KHZ |
| 20 | 21.6 | 1.39 | 46.30 KHZ |
| 30 | 23.4 | 1.28 | 42.74 KHZ |
| 40 | 25.2 | 1.19 | 39.68 KHZ |
| 50 | 27.0 | 1.11 | 37.04 KHZ |
| 60 | 28.8 | 1.04 | 34.72 KHZ |

TABLE II-continued

| Multichannel Data Compressor Compression Ratio | | | |
|---|---|---|---|
| Absolute Value Transmissions (% of time) | Average Bits Per Data Packet | Compression Ratio | Sampling Rate |
| 70 | 30.6 | 0.98 | 32.68 KHZ |
| 80 | 32.4 | 0.93 | 30.86 KHZ |
| 90 | 34.2 | 0.88 | 29.24 KHZ |
| 100 | 36.0 | 0.83 | 27.78 KHZ |

The data compression ratios listed on Table II are calculated on the basis that it takes 30 bits to transmit the uncompressed data from the three sources used in the embodiment shown in FIG. 1. The 30 bits include an 8 bit data value from each source plus a 2 bit data identification code which identifies the source of the data. The compression ratio when only composite data D, E, and F is being transmitted is $30/18 = 1.67$. For the sampling rate, it is assumed the transmitter is capable of transmitting 1,000K bits per second. The sampling rate (SR) for a conventional system is therefore:

$$SR = \frac{1,000,000 \text{ bits/second}}{30 \text{ bits/sample}} = 33.33 \text{ KHZ/samples/second}$$

For the multichannel data compressor, the sampling rate SR (MCDC) when only compressed data is being transmitted is:

$$SR\ (MCDC) = \frac{1,000,000 \text{ bits/sec.}}{18 \text{ bits/sample}} = 55.56 \text{ KHZ samples/second}$$

As can be seen from Table II, the compression ratio decreases as the number of transmission of absolute values increases per unit of time. When absolute data values must be sent at least 70% of the time, the compression ratio becomes less than unity and the effectiveness of the multichannel data compressor is extinguished. However, when the absolute data values are transmitted less than 30% of the time, the data compression is significant resulting in a 28 to 67% increase in the sampling rate.

Figure 8:
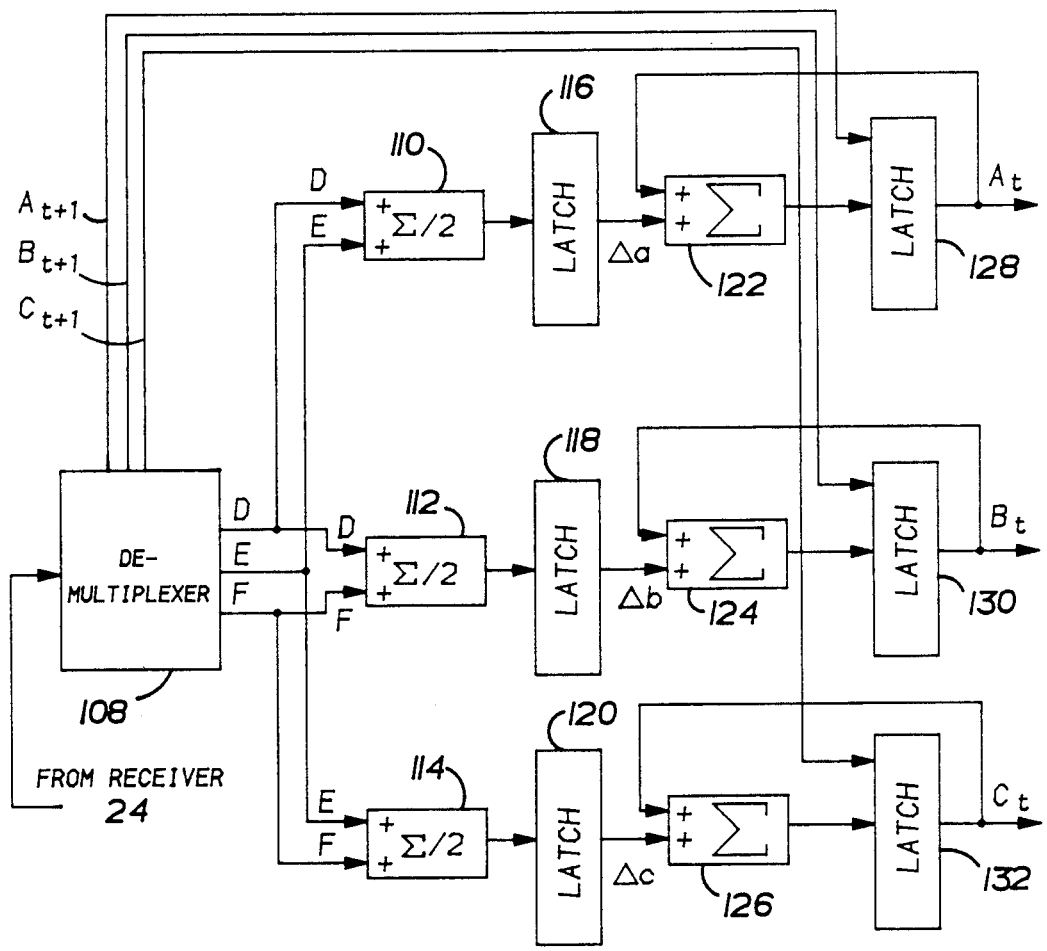
FIG. 8 is a circuit diagram of the multichannel data expander.

The details of the multichannel data expander (MCDE) 26 of the receiver subsystem 4 are shown in FIG. 8. A demultiplexer 108 decodes the binary code attached to each 18 bit word message received from the receiver 24 and will demultiplex the received data accordingly. For example, if the binary code is 00 indicating that the received transmission contains composite data values D, E, and F, the demultiplexer 108 will transfer the composite data values D, E, and F to the sum amplifiers 110, 112 and 114 as shown. Sum amplifier 110 will add composite data values D and E then divide the sum by 2 to produce a correction value $\Delta a$ which is equal to difference data value $\Delta A$.
where:

$(D+E)/2 = (\Delta A + \Delta B - \Delta C + \Delta A - \Delta B + \Delta C)/2$ $(D+E)/2 = (2\Delta A)/2 = \Delta A = \Delta a$ In a like manner, sum amplifier 112 sums composite data values D and F to reproduce the correction value $\Delta b$ which is equal to difference data value $\Delta B$.
where:

$$(D+F)/2=(\Delta A+\Delta B-\Delta C-\Delta A+\Delta B+\Delta C)$$
$$(D+F)/2=(2\Delta B)/2=\Delta B=\Delta b$$

Sum amplifier 114 sums composite data values E and F to produce a correction data value $\Delta c$ which is equivalent to difference data value $\Delta C$.
where:

$$(E+F)/2=(\Delta A-\Delta B+\Delta C-\Delta A+\Delta B+\Delta C)/2$$

$$(E+F)/2=(2\Delta C)/2=\Delta C=\Delta c$$

The correction values $\Delta a$, $\Delta b$, and $\Delta c$ generated by sum amplifier 110, 112 and 114, respectively, are temporarily stored in correction data latches 116, 118 and 120, respectively.

The receiver data latches 128, 130 and 132 respectively store the values of the data $A_t$, $B_t$ and $C_t$ generated from the content of the preceding transmission received by the receiver 24. The value $A_t$ stored in latch 128 is updated to the new value $A_{t+1}$ by adding in sum amplifier 122 the value of $A_t$ currently stored in receiver data latch 128 with the correction data value $\Delta a$ stored in correction data latch 116. This new value of data $A_{t+1}$ is then stored in receiver data latch 128 as the current value of data A. This process is substantially the reverse of the process used to generate the composite data values D, E, and F in the multichannel data compressor 20.

In a like manner, the data value $B_t$ stored in receiver data latch 130 is updated to its new value $B_{t+1}$ by adding in sum amplifier 124, the value of data $B_t$ currently stored in receiver data latch 130 with the correction data value $\Delta b$ stored in correction data latch 118. The sum of $B_t$ and $\Delta b$, is the value of data $B_{t+1}$ which is stored in receiver data latch 130 as the current value of data B. The data value $C_{t+1}$ is generated by adding in sum amplifier 126 to the correction data value $\Delta c$ to the value of the data $C_t$ stored in receiver data latch 132. The new value, data $C_{t+1}$, is then stored in receiver data latch 132 as the current value of data C.

When the binary code contained in the 18 bit word received from the receiver 24 is not 00, indicating that the received word contains the absolute value of two of the three data sources, the demultiplexer 108 will identify from the binary code which absolute data values were received and transfer them directly to the receiver data latches 128, 130 or 132 as required. For example, if the binary code contained in the most significant bit positions (bits 18 and 17) of the received 18 bit word is 01, indicating that the absolute values of the data $A_{t+1}$ and $B_{t+1}$ are contained in the received word, the demultiplexer 108 will transfer the absolute value of data $A_{t+1}$ to receiver data latch 128 where it is stored as the current value of data A and will transfer the 8 bit absolute value of data $B_{t+1}$ to receiver data latch 130 where it is stored as the current value of data B. When the binary code is 10, the demultiplexer 108 will transfer the 8 bit absolute value of data $A_{t+1}$ to receiver data latch 128 where it is stored and will transfer the 8 bit absolute value of data $C_{t+1}$ to receiver data latch 132. When the binary code is 11, the demultiplexer 108 will transfer the 8 bit absolute value of data $B_{t+1}$ to receiver data latch 130 and transfer the 9 bit absolute value of data $C_{t+1}$ to receiver data latch 132 where it is stored.

The receiver data latches 128, 130 and 132 always store the most current values of data A, B, and C. These values may be the 8 bit absolute values of the data contained in the 18 bit words, or the absolute values generated from compressed data. The data values may be transferred directly to a utilization device or may be converted to an analog format by Digital-to-Analog converters as shown in FIG. 1.

What is claimed is:

1. A data compressor for a data transmission system having a plurality of data sources repetitively generating data values and a transmitter for transmitting data comprising:
    a plurality of difference means, one associated with each data source, each difference means subtracting sequentially generated data value generated by its associated data source, to generate difference data values;
    means for summing said difference data generated by said plurality of difference means in a plurality of different sequences to generate a plurality of composite data values; and
    multiplexer means connected to said transmitter for multiplexing said composite data values in a predetermined format to generate a compressed data word for transmission by said transmitter.

2. The data compressor of claim 1 wherein each of said difference means comprises:
    a data value latch for temporarily storing each data value generated by its associated data source; and
    a difference amplifier for subtracting the data value stored in said data value latch from the next sequentially generated data value generated by said associated data source to generate said difference data values.

3. The data compressor of claim 2 wherein said means for summing comprises:
    a plurality of sum amplifiers, each of said sum amplifiers summing said difference data values generated by said plurality of difference means in a predetermined sequence to generate said composite data value, each of said sum amplifiers summing said difference data values in a different predetermined sequence to generate a different composite data value; and
    a composite data latch connected to said multiplexer means for temporarily storing each of said composite data values for transmission by the transmitter.

4. The data compressor of claim 3 having a selector switch interposed between said composite data latch and said multiplexer means, said selector switch receiving said data values generated each of said data sources and being connected to said composite data latch, said selector switch being responsive to the magnitude of each of said composite data values to transfer said composite data values to said multiplexer means when the magnitude of all of said composite data values are less than a predetermined value, and said selector switch transferring selected data values received from said data sources to said multiplexer means when at least one of said composite data values exceeds said predetermined value.

5. The data compressor of claim 1 wherein said plurality of data sources comprises:
    a first data source repetitively generating a data value A:
    a second data source repetitively generating a data value B; and
    a third data source repetitively generating a data value C, and wherein said plurality of difference means comprises:

a first difference means for subtracting from each newly generated data value A, the previously generated data value A to generate a difference data value ΔA for each newly generated value of data value A;

a second difference means for subtracting from each newly generated data value B, the previously generated data value B to generate a difference data value ΔB for each newly generated value of data value B; and a third difference means for subtracting from each newly generated data value C, the previously generated data value C to generate a difference data value ΔC for each newly generated value of data value B.

6. The data compressor of claim 5 wherein said means for summing comprises:

a first sum amplifier for summing the difference data values ΔA, ΔB and ΔC to generate a first composite data value D where composite data value D=ΔA+ΔB−ΔC;

a second sum amplifier for summing the difference data values ΔA, ΔB and ΔC to generate a second composite data value E where composite data value E=A−ΔB+ΔC; and a third sum amplifier for summing the difference data values ΔA, ΔB and ΔC to generate a third composite data value F where composite data value F=ΔB+ΔC−ΔA.

7. The data compressor of claim 6 wherein said means for summing has a composite data latch for temporarily storing said composite data D, said composite data E and said composite data F.

8. The data compressor of claim 7 having a selector switch interposed said composite data latch and said multiplexer, said selector switch receiving directly said data values A, B and C generated by said first, second and third data sources, respectively, and said composite data values D, E and F stored in said composite data value latch, said selector switch responsive to the magnitude of each of said composite data values D, E and F, to transfer said composite data values D, E and F to said multiplexer means when the magnitude of each of said composite data values is less than a predetermined value and for transferring selected ones of said data values A, B and C to said multiplexer means when at least one of said composite data values D, E or F exceeds said predetermined value, said selector switch further having means for transmitting a binary code to said multiplexer means identifying the data values being transferred.

9. The data compressor of claim 8 wherein said predetermined value of said composite data values is a predetermined number of bits.

10. The data compressor of claim 9 wherein said predetermined number of bits is 5.

11. The data compressor of claim 10 wherein each transmission by the transmitter is an 18 bit word, said 18 bit word comprises a 2 bit binary code identifying the type of data being sent.

12. The data compressor of claim 11 wherein said 2 bit binary code identifies that the transmitted word contains compressed data, bit positions 16-2 of said transmitted word contain the composite data values D, E and F.

13. The data compressor of claim 11 wherein said 2 bit binary code identifies that the transmitted word contains data values, bit positions 16-9 contain a first selected one of said data values A, B and C and bit positions 8-1 contain a second selected one of said data values A, B and C.

14. The data compressor of claim 8 wherein said selector switch has a logic circuit for selecting the data values to be transferred to said multiplexer in response to detecting which of said composite data values D, E and F exceeds said predetermined value.

15. A multichannel data expander for a receiver system having a receiver receiving transmissions from a remote location containing compressed data from a plurality of data sources, the compressed data containing a plurality of composite data values, the data expander comprising:

a demultiplexer connected to the receiver for demultiplexing said compressed data to output, individually, each of the composite data values contained in each compressed data transmission;

a plurality of sum amplifiers, each sum amplifier summing at least two different composite data values to generate a correction data value for a respective one of a plurality of data values;

a plurality of data value latches each storing a respective one of said data values; and a plurality of adders, one associated with a respective one data value latch and the sum amplifier which generates a correction data value for the data value stored in said respective one data value latch for summing said correction data value with said data value to generate an updated data value.

16. The data expander of claim 15 wherein said plurality of composite data values is three composite data values, identified as composite data value D, composite data value E and composite data value F, said plurality of sum amplifiers comprises:

a first sum amplifier summing composite data value D with composite data value E to generate a correction data value Δa;

a second sum amplifier summing composite data value D with composite data value F to generate a correction data value Δb; and a third sum amplifier summing composite data value E with composite data value F to generate a correction data value Δc.

17. The data expander of claim 16 wherein plurality of data value latches comprises:

a first data value latch storing an absolute data value of a data A;

a second data value latch storing an absolute data value of a data B; and a third data value latch storing an absolute data value of a data C;

wherein said plurality of adders comprises:

a first adder for adding the correction value Δa received from said first sum amplifier with the value of data A stored in said first latch to generate a new data value for data A, said new data value for data A being stored in said first data value latch as data A;

a second adder for adding the correction value Δb received from said second sum amplifier with the value of data B stored in said second data value latch to generate a new value for data B, said new value for data B being stored in said second data value latch as data B; and a third adder for adding the correction value Δc received from said third sum amplifier with the value of data C stored in said third data value latch to generate a new value for data value C, said new value for data value C being stored in said second data value latch as data C.

18. A compressed data transmission system for transmitting the data generated by a plurality of data sources comprising:
a multichannel data compressor for compressing the data values received from said plurality of data sources, said data compressor having a plurality of difference means, one for each data source, each difference means subtracting sequentially generated data values generated by its associated data source, to generate difference data values, means for summing said difference data values in a plurality of different sequences to generate a plurality of composite data values, and multiplexer means for multiplexing said plurality of composite data values to generate a compressed data word;
a transmitter for transmitting said compressed data word;
a remotely located receiver for receiving said compressed data word; and
a multichannel data expander for regenerating each of said data values from said compressed word received from said receiver.

19. The transmission system of claim 18 wherein said multichannel data expander comprises:
demultiplexer means connected to said receiver for demultiplexing said compressed data to regenerate each of said plurality of composite data values;
a plurality of composite data sum amplifiers, each composite data sum amplifier summing at least two different composite data values to generate a correction value, said plurality of sum amplifiers collectively generating a plurality of correction data values corresponding to said plurality of difference data values generated by said multichannel data compressor;
a plurality of data value latches, each storing a data value, each of said data values corresponding to a respective one of said data values generated by said plurality of data sources; and
a plurality of adders; one associated with each data value latch and the sum amplifier which generates a correction data value for the data value stored in said associated data value latch, each adder summing said correction data value to said data value stored in said data value latch to generate an updated data value which is stored in its associated data value latch.

20. The transmission system of claim 19 wherein said multichannel data compressor has means responsive to any of said composite data values exceeding a predetermined value to transfer the absolute data value of at least one of said data values to said transmitter for transmission in place of said compressed data word; and
wherein said multichannel data expander has means responsive to the reception of said absolute value for storing said absolute value in said data value latch storing the data value corresponding to said absolute value.

21. The transmission system of claim 20 wherein each of said composite data comprises a maximum number of bits, said predetermined value is a predetermined number of bits equal in number to said maximum number of bits.

22. The transmission system of claim 21 wherein the maximum number of bits in each of said composite data values is 5 bits, said predetermined value is 5 bits.

23. The transmission system of claim 21 wherein said plurality of data sources comprises a first data source generating a data value A, a second data source generating a data value B and a third data source generating a data value C, said plurality of difference means comprises a first difference means generating a difference data value $\Delta A$, a second difference means generating a difference value $\Delta B$, and a third difference means generating a difference data value $\Delta C$.

24. The transmission system of claim 23 wherein each of said first, second and third difference means comprises a data latch for temporarily storing the data value received from its associated data source, and a difference amplifier for subtracting the data value stored in said data latch from the next data value generated by its associated data source to generate said difference data value.

25. The transmission system of claim 23 wherein said means for summing comprises:
a first sum amplifier for summing difference data values $\Delta A$, $\Delta B$ and $\Delta C$ to produce a first composite data value D, where composite data value $D = \Delta A + \Delta B - \Delta C$;
a second sum amplifier for summing the difference data values $\Delta A$, $\Delta B$ and $\Delta C$ to generate a second composite data value E where composite data value $E = \Delta A - \Delta B + \Delta C$; and
a third sum amplifier for summing the difference data value $\Delta A$, $\Delta B$ and $\Delta C$ to generate a third composite data value F where composite data value $F = \Delta B + \Delta C - \Delta A$.

26. The transmission system of claim 25 wherein said multichannel data compressor has a composite data latch for temporarily storing said composite data values D, E and F.

27. The transmission system of claim 26 wherein said multichannel data compressor has a selector switch interposed said composite data latch and said multiplexer, said selector switch receiving directly from said data sources said data values A, B and C and said composite data values D, E and F stored in said composite data latch and responsive to the magnitude of all of composite data values being less than a predetermined value for transferring said composite data values to said multiplexer means and further responsive to any one of said composite data values exceeding said predetermined value to transfer at least one selected data value to said multiplexer means.

28. The transmission system of claim 27 wherein said selector switch transfers two selected data values to said multiplexer means in response to at least one of said composite data values exceeding said predetermined value.

29. The transmission system of claim 28 wherein said composite data values have a maximum number of bits which may be transmitted by the transmitter, said predetermined value is equal to said maximum number of bits.

30. The transmission system of claim 29 wherein said compressed data word transmitted by said transmitter comprises 18 bits, said predetermined number of bits is 5 bits.

31. The transmission of system of claim 30 wherein the two most significant bits of said 18 bit word transmitted by the transmitter are a binary code identifying the 18 bit word as containing compressed data or absolute data values.

32. The transmission system of claim 31 wherein said selector switch includes means for selecting the data values to be transferred to the multiplexer means in response to the magnitude of each of said composite data values and means for generating said binary code identifying the data values transferred to said multiplexer.

33. The transmission system of claim 27 wherein said demultiplexer means demultiplexes said received word to regenerate said composite data values D, E and F.

34. The transmission system of claim 33 wherein said plurality of sum amplifiers comprises:
a first composite data sum amplifier for summing said composite data values $(D+E)/2$ to generate a first correction data value having a value corresponding to difference data value $\Delta A$;
a second composite data sum amplifier for summing composite data values $(D+F)/2$ to generate a second correction data value having a value corresponding to said difference data value $\Delta B$;
a third composite data sum amplifier for summing composite data values $(E+F)/2$ to generate a third correction data value having a value corresponding to said difference data value $\Delta C$.

35. The transmission system of claim 34 wherein said plurality of data value latches comprises:
a first receiver data latch storing a current value of data value A;
a second receiver data latch storing a current value of data value B; and
a third receiver data latch storing a current value of data value C.

36. The transmission system of claim 35 wherein said plurality of adders comprises:
a first adder for adding said first correction data value to the data value A stored in said first receiver data latch to generate a new current value for data value A;
a second adder for adding said second correction data value to the data value B stored in said second receiver data latch to generate a new current value for data value B; and
a third adder for adding said third correction data value to the data value C stored in said third receiver data latch to generate a new current value for data value C.

37. A method for compressing data from a plurality of data sources for transmission by a single transmitter comprising the steps of:
subtracting from the data value generated by each data source, the preceding data value generated by the same data source to generate a plurality of difference data values, one difference data value for each data source;
summing said plurality of difference data values in a plurality of different predetermined sequences to generate a plurality of composite data values; and
multiplexing with a multiplexer said composite data values to generate a compressed data word for transmission by the transmitter.

38. The method of claim 37 wherein said step of subtracting comprises the steps of:
storing for one data cycle, in a data value latch, the data value generated by each data source; and
subtracting the data value stored in said data value latch from the next sequentially generated data value generated by the same data source to generate said difference data values.

39. The method of claim 38 further including the step of temporarily storing said plurality of difference data in a difference data latch.

40. The method of claim 38 further including the steps of:
comparing the magnitude of each of said composite data values to determine if any one of said composite data signals is greater than a predetermined value;
transferring said composite data values to said multiplexer in response to the magnitude of all of said composite data values being less than said predetermined value; and
transferring selected data values generated by said plurality of data sources to said multiplexer in response to at least one of said composite data values exceeding said predetermined value.

41. A method for expanding compressed data containing a plurality of composite data generated from the data received from a plurality of data sources comprising the steps of:
demultiplexing received compressed data to reconstruct said plurality of composite data values;
selectively summing, in each of a plurality of summing circuits, two different composite data values to generate a plurality of correction data values, one associated with the data value generated by each data source;
summing each correction data value to an associated current data value to generate a plurality of new current data values, one for each data value; and
storing each new current data value in individual data latches as a current data value.

* * * * *